Oct. 13, 1931.  C. NELSON  1,826,947

PRESSURE COOKER

Filed March 7, 1929  2 Sheets-Sheet 1

INVENTOR
CARL NELSON
By *[signature]*
ATTORNEYS

Oct. 13, 1931.  C. NELSON  1,826,947
PRESSURE COOKER
Filed March 7, 1929  2 Sheets-Sheet 2

INVENTOR
CARL NELSON
By Paul Paul M Moore
ATTORNEYS

Patented Oct. 13, 1931

1,826,947

UNITED STATES PATENT OFFICE

CARL NELSON, OF EAU CLAIRE, WISCONSIN, ASSIGNOR TO NATIONAL PRESSURE COOKER COMPANY, OF EAU CLAIRE, WISCONSIN, A CORPORATION OF WISCONSIN

PRESSURE COOKER

Application filed March 7, 1929. Serial No. 345,173.

This invention relates to a steam or pressure cooker, and has for an object to provide a device of the present character wherein will be incorporated specific and novel features and characteristics of construction designed to render the present cooker an improvement generally over more or less similar devices heretofore known.

A further object of the invention is to provide a cooker constituted by a cooker body having an annular flange at its upper portion, a cover for the said body having an annular portion which will be situated above the annular flange of said body, manipulating handles for the cooker which will be located upon handle brackets situated at the underside of the annular flange of the cooker body, and a clamping ring which will fit about the annular flange of the cooker body and the annular portion of the cover therefor to fasten the said cover in sealing relation to the cooker body and will include cut-away portions for receiving the said handle brackets.

A still further object is to provide a cooker as stated, wherein the annular flange of said body will include a beveled lower surface extending outwardly and upwardly to the circumference of the said annular flange, wherein the annular portion of said cover will include a beveled upper surface extending outwardly and downwardly to the circumference of the said cover, and wherein the clamping ring will be constituted by a plurality of pivotally connected segmental channel sections each including an upper beveled surface adjacent the channel extending inwardly and upwardly and adapted to engage the beveled surface of the annular portion of the cooker body cover, and a lower beveled surface adjacent said channel extending inwardly and downwardly and adapted to engage the beveled surface of the annular flange of the cooker body.

And a still further object is to provide a novel and improved arrangement for locking the clamping ring upon the cooker to fasten the cover down upon the cooker body in steam-tight fashion.

Other objects and advantages of the invention will become apparent as the full description thereof proceeds, it being understood that the disclosure herein is merely illustrative and intended in no way in a limiting sense, slight changes in details of construction and arrangement of parts being permissible so long as within the scope of the claims which follow.

In the accompanying drawings forming a part of this specification,

Figure 1:
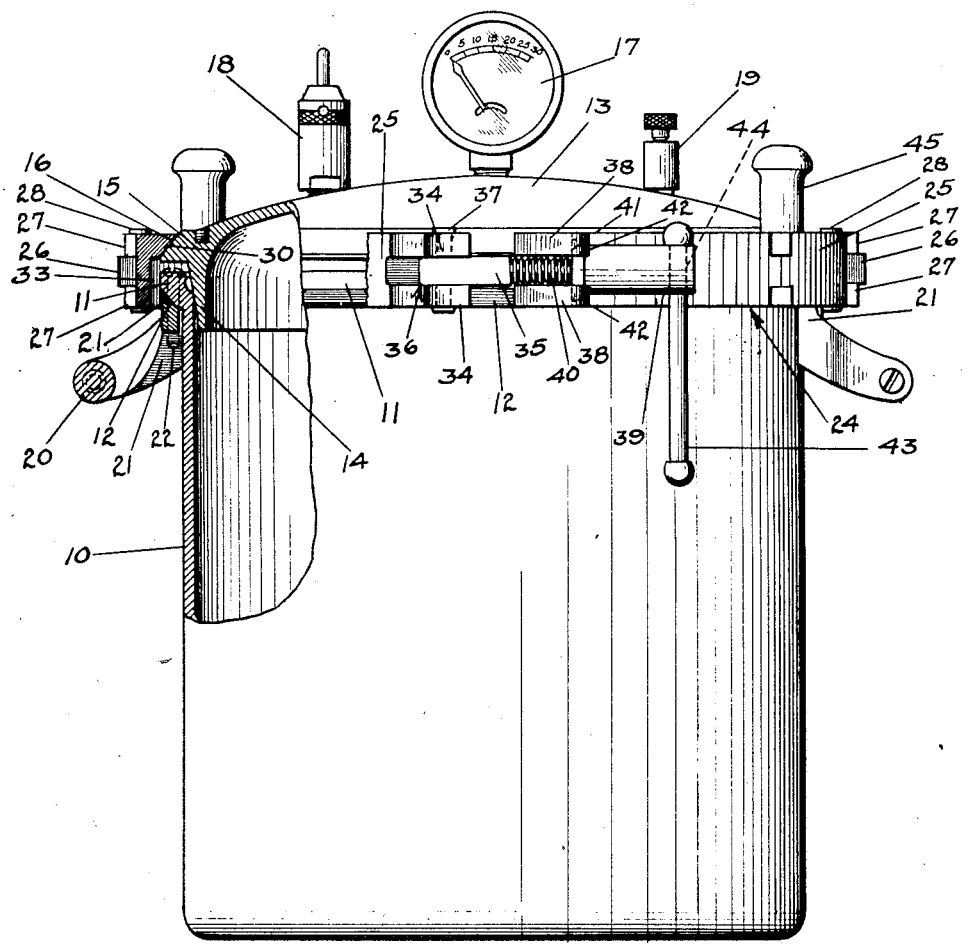
Fig. 1 is an elevational view, partially sectioned and partially broken away, of a steam or pressure cooker in which the features of the invention are incorporated.
Figure 3:
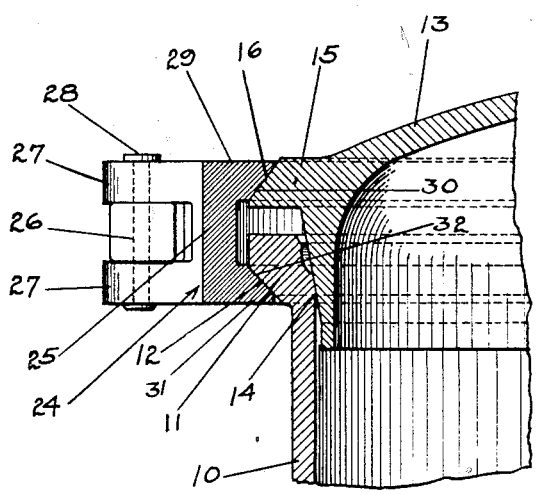
Fig. 3 is an enlarged fragmentary sectional view, taken as on line 3—3 in Fig. 2.

With respect to the drawings and the numerals of reference thereon, 10 denotes the body of the cooker provided at its upper, open portion with an outwardly extending annular flange 11 including a lower beveled surface 12 extending outwardly and upwardly, and 13 indicates the cooker cover, having a cylindrical portion 14 adapted to fit within the body 10 in steam-tight fashion, and also having an outwardly extending annular portion 15 including an upper beveled surface 16 extending outwardly and downwardly. Preferably, the circumferences of the circular flange 11 and the annular portion 15 terminate flush with each other as disclosed.

The cover 13 may include the usual steam gauge 17, safety control 18, and pet cock 19, all for well known purposes.

Figures 2, 4:
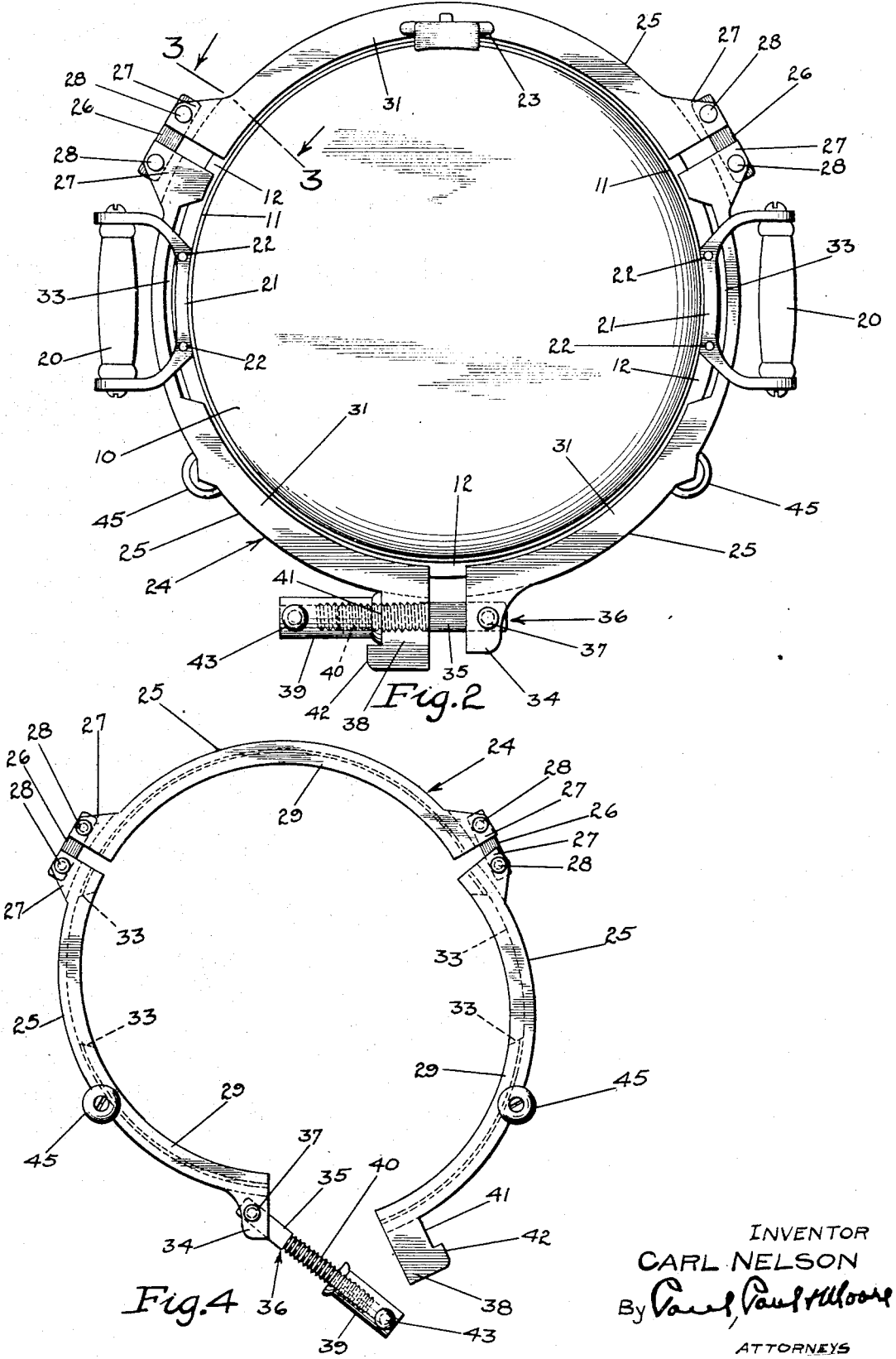
Fig. 2 is a bottom plan view of the cooker of Fig. 1.
Fig. 4 is a plan view of the clamping ring removed from the remainder of the cooker.

Manipulating handles 20 for the cooker are carried in any suitable manner upon handle brackets 21 attached, as at 22, to the cooker body directly at the underside of the annular flange 11, there desirably being two of said handle brackets situated diametrically opposite each other. See Figs. 1 and 2. A lifting ring 23 may be conveniently attached to the cooker body, the ring shown being situated near the bottom of said body.

A clamping ring 24 is adapted to fit about the annular flange 11 of the cooker body and the annular portion 15 of the cover 13 to fasten said cover in steam sealing relation to said body.

As disclosed, the clamping ring is constituted by a plurality of segmental channel sections 25 pivotally connected to each other, as by links 26 in spaced ears 27 of said sections and pins 28 in said ears and passing through said links. Each channel section 25 includes an upper channel arm 29 having a lower beveled surface 30 adjacent the channel of said section and extending inwardly of the clamping ring and upwardly to be capable of engaging the beveled surface 16 of the annular portion 15 of the cooker body cover, and each channel section also includes a lower channel arm 31 having an upper beveled surface 32 adjacent the channel of the section and extending inwardly of the clamping ring and downwardly to be capable of engaging the beveled surface 12 of the annular flange 11 of the cooker body.

The lower channel arms 31 of two of the segmental channel sections are cut-away as at 33 to afford clearance for the handle brackets 21. See Fig. 2.

Spaced apart ears 34 at a free end of a segmental channel section 25 receive the desirably square end portion 35 of a threaded or bolt member 36, a pin 37 in said ears 34 and passing through the member 36 pivotally supporting the said member upon the mentioned segmental channel section. Ears 38 at the opposite free end of a section 25 are spaced apart a suitable distance so that the member 36 can be freely received between said ears, and a special nut 39 upon the threaded portion 40 of said member 35 is adapted to removably fit against the inner edges 41 of said ears 38 and back of shoulders 42 adjacent said inner edges. A manipulating lever 43 freely slidable in a transverse opening 44 in the nut 39 is for the purpose of adjusting said nut upon the threaded portion 40 of the bolt member 36.

Upstanding finger pieces 45 upon the clamping ring are desirably constructed of material which is a poor conductor of heat, and are for the purpose of more easily manipulating the clamping ring.

The manner in which the cover is fastened down upon the cooker body and removed from said body is obvious. Upon said cover being inserted into said body, the clamping ring is placed about the cover and body so that the beveled surfaces 16, 30 and 12, 32, respectively, are adjacent each other and so that the cut-away portions 33 fit about the handle brackets 21 situated on the underside of the cooker body flange 11. The bolt member 36 is then inserted between the spaced apart ears 38 so that the nut 39 is situated at the side of said ears opposite the pivot for the bolt member, and finally the lever 43 is manipulated to turn the nut 39 home against the inner edges 41 of the ears 38 to seat said nut behind the shoulders 42, and to contract the clamping ring upon the beveled surfaces of the cooker body and cover to thus cause a steam-tight seal to exist between said body and cover, as will be evident. To release the clamping ring from the cooker, the nut 39 is turned in reverse direction and caused to recede upon the threaded portion 40 of the bolt member 36 an amount sufficient to allow said nut to clear the shoulders 42, as will be understood, so that the segmental channel sections 25 can be withdrawn from the beveled surfaces, as by manipulation of the finger pieces 45.

I claim as my invention:

1. A cooker constituted by a cooker body having an annular flange at its upper portion, a cover for said body having an annular portion situated above the annular flange of said body, handle brackets situated at the underside of the annular flange of the cooker body, and a clamping ring constituted by a plurality of pivotally connected segmental channel sections each including an upper channel arm adapted to engage said annular portion of the cooker body cover and a lower channel arm adapted to engage the annular flange of said cooker body, a portion of a lower channel arm of a segmental section being cut away to clear a handle bracket.

2. A cooker constituted by a cooker body having an annular flange at its upper portion including a beveled lower surface extending outwardly and inwardly, a cover for said body having an annular portion situated above the annular flange of said body and including a beveled upper surface extending outwardly and downwardly, a handle bracket situated at the underside of the annular flange of the cooker body, and a clamping ring constituted by a plurality of pivotally connected segmental channel sections each including an upper channel arm having a lower beveled surface extending inwardly of said clamping ring and upwardly and adapted to engage the beveled surface of the annular portion of the cooker body cover and a lower channel arm having an upper beveled surface extending inwardly of the clamping ring and downwardly and adapted to engage the beveled surface of the annular flange of the cooker body, a portion of a lower channel arm of a segmental section being cut away to clear said handle bracket.

In witness whereof, I have hereunto set my hand this 26th day of February, 1929.

CARL NELSON.